W. O. Headley.
Trunk Caster.
N° 48,937. Patented July 25, 1865.
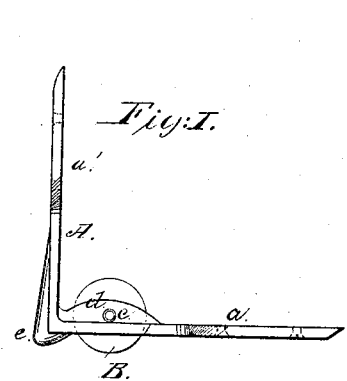
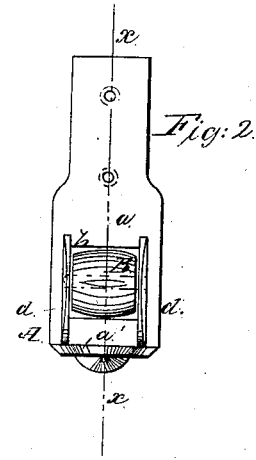
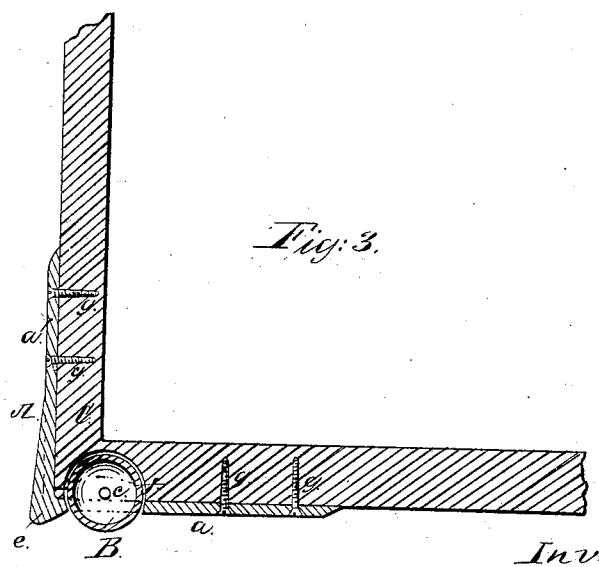
Witnesses:
Wm Freurn
Theo Fusell
Inventor:
W. O. Headley
per Munn & Co
Attorneys

UNITED STATES PATENT OFFICE.

WILLIAM O. HEADLEY, OF NEWARK, NEW JERSEY.

TRUNK-CASTER.

Specification forming part of Letters Patent No. 48,937, dated July 25, 1865.

*To all whom it may concern:*

Be it known that I, WILLIAM O. HEADLEY, of Newark, in the county of Essex and State of New Jersey, have invented a new and Improved Trunk-Caster; and I do hereby declare that the following is a full, clear, and exact description thereof, which will enable others skilled in the art to make and use the same, reference being had to the accompanying drawings, forming part of this specification.

This invention consists in combining in a novel way a trunk-caster and a bracket, so that the device may be cheaply manufactured and be very strong and durable and serve as an efficient protection for the angles of the trunk, and at the same time admit of the trunk being easily moved or rolled about.

In the accompanying drawings, Figure 1 is a side view of my invention; Fig. 2, a plan or top view of the same; and Fig. 3, an enlarged vertical section of the same applied to the angle or corner of a trunk, taken in the line $x$ $x$, Fig. 2.

Similar letters of reference indicate corresponding parts.

A represents a bracket, which may be of malleable cast-iron and of right-angular form, as shown in Figs. 1 and 3. One arm, $a$, of this bracket has an opening, $b$, in it to admit of a roller, B, being fitted in it, the axis $c$ of said roller having its bearings in lugs or projections $d$ $d$, which are at two opposite sides of the opening $b$ at the inner surface of the arm $a$, and extend the whole length of said opening and join the inner side of the upright arm $a'$ of the bracket, serving as braces or supports for the two arms $a$ $a'$. The exterior of the lower part of the upright arm $a'$ has a projection or prominence, $e$, which extends down below it nearly to the plane of the lower edge of the roller B, as shown in Figs. 1 and 3. This projection or prominence also strengthens the bracket and protects the caster or roller B.

When the device is applied to a trunk, C, the caster or roller B is fitted in a recess, $f$, in the trunk, as shown clearly in Fig. 3. The bracket is secured to the trunk by screws or nails.

The bracket lugs or projections $d$ $d$ and the prominence or projection $e$ are all cast in one piece.

I am aware that brackets and casters for trunks have hitherto been combined, but not arranged as herein shown and described, so as to possess durability and strength. I therefore do not claim, broadly, a combined bracket and caster irrespective of the construction and arrangement herein shown and described.

I claim, therefore, as new and desire to secure by Letters Patent—

A combined bracket and caster for trunks when the former is cast with an exterior projection or projections, $e$, and with lugs or projections $d$ $d$ at the inner surface of one of its arms, $a$, by the side of the opening $b$, which receives the caster or roller B, and on which lugs or projections the axis of the caster or roller is fitted, substantially as described.

WM. O. HEADLEY.

Witnesses:
 M. M. LIVINGSTON,
 C. L. TOPLIFF.